July 10, 1962 C. P. PARENT ET AL 3,043,336
SOLENOID VALVE
Filed April 17, 1959
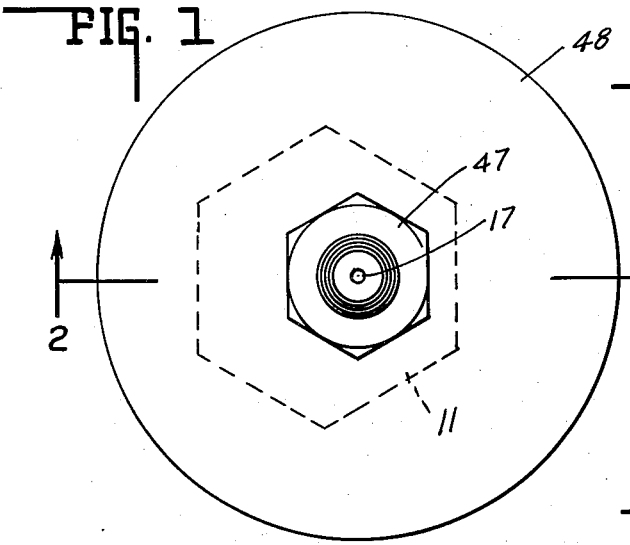
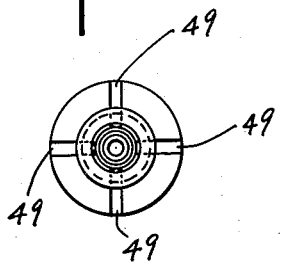
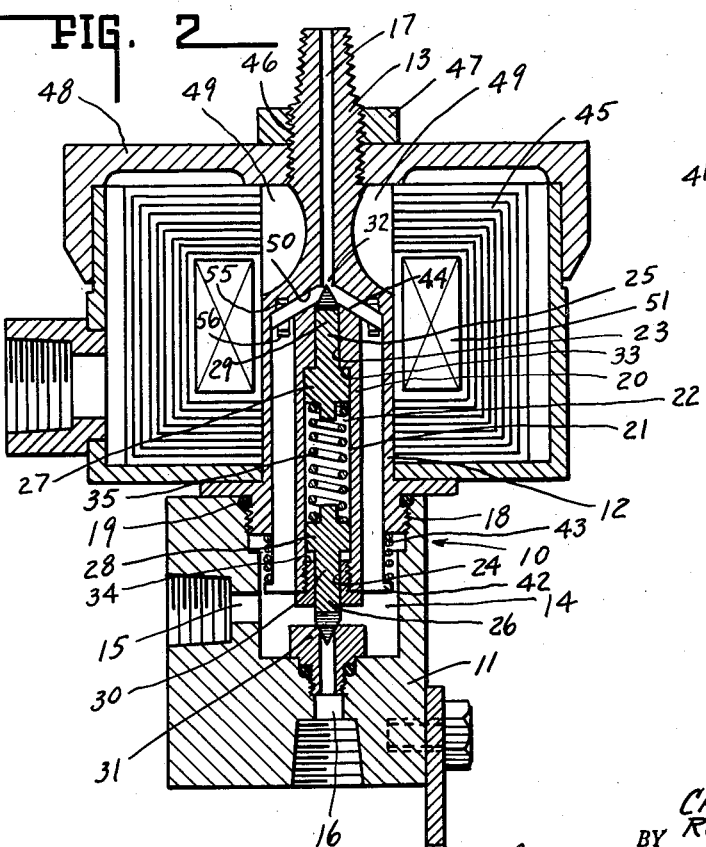
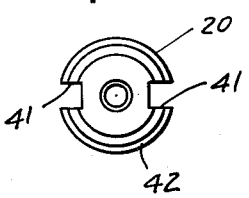
INVENTORS.
CHARLES P. PARENT.
BY ROBERT B. SPEAR.
Lockwood, Woodard, Smith & Weikart.
ATTORNEYS.

United States Patent Office 3,043,336
Patented July 10, 1962

3,043,336
SOLENOID VALVE
Charles Pierre Parent, Indianapolis, and Robert Bruce Spear, Beech Grove, Ind., assignors to Atkomatic Valve Company, Inc., Indianapolis, Ind., a corporation
Filed Apr. 17, 1959, Ser. No. 807,139
7 Claims. (Cl. 137—625.27)

This invention relates to valves and finds its primary utility in high pressure, solenoid-operated pilot valves of the type conventionally used in hydraulic control systems.

Conventional solenoid-operated high pressure valves comprise a relatively massive electromagnetic structure in order to provide the valve-operating forces necessary to close the valve against relatively high hydraulic pressure. Because of the massive electromagnetic structure, conventional valves of this type are unduly expensive and inherently operate at relatively high electrical losses. These losses consist of the usual heat, eddy current, and hysteresis types of losses. Accordingly, it would be desirable to provide a solenoid valve having minimum size and capable of developing a maximum amount of power with minimum electromagnetic losses.

One of the reasons that conventional solenoid valves require such large electromagnetic structure is that such valves operate to shut off relatively high pressure flow of fluid. In addition to the high working pressures involved, conventional valves of this type are of such physical nature that flow of fluid through the valve creates relatively high frictional forces, which add to the forces created by the high pressure. Consequently, it would also be desirable to so design valves of this type that the effects of high pressure flow of fluid and resuling frictional forces will be reduced to a substantial extent, thereby making it possible to reduce the size and cost of the electromagnetic structure of the valve.

A further problem present in such valves is that the plungers used to close off the flow of fluid are subjected to repeated shocks and abrading forces as they seat in their respective valve seats. Such shocks and abrading forces result in the plungers becoming unfit for use after only a short period of operation.

It is, therefore, an object of the present invention to provide an improved valve suitable for use in high pressure, hydraulic control systems.

A further object of the present invention is to provide a mounting for a plunger which reduces wear on the plunger resulting from the seating of the plunger in a valve seat.

Frequently in such valves as above described there is a hydraulic pressure head acting on a plunger of the valve tending to hold the plunger in its respective valve seat. When the solenoid of the valve is energized to withdraw the plunger from its valve seat, a certain period of time elapses as the solenoid builds up enough electromagnetic force to move the valve out of its closed position. More force may be applied and more rapid operation of the valve would result if a means could be provided for striking the plunger with a hammer blow action to remove the plunger from its valve seat.

It is, therefore, another object of the present invention to provide a means for unseating a valve plunger by striking the plunger with a hammer blow action.

Still further objects will become apparent as the description proceeds.

In accordance with the invention there is provided a solenoid-operated valve comprising a pair of mutually facing valve seats, an armature, and a pair of plungers reciprocably mounted in the armature so as to project oppositely therefrom toward respective ones of the valve seats. The armature is provided with a pair of abutments for preventing movement of the plungers past respective outermost positions relative to the armature. A spring is arranged between the plungers and yieldably urges the plungers into their most outward positions. The armature is arranged to reciprocate between a position in which one plunger is seated in one valve seat and a position in which the other plunger is seated in the other valve seat.

The full nature of the invention will be understood from the accompanying drawing and the following description and claims:

FIG. 1 is a top plan view of the solenoid valve as provided in accordance with this invention.

FIG. 2 is a cross section taken on line 2—2 of FIG. 1.

FIG. 3 is a top plan view of the stationary plunger shown in FIG. 2.

FIG. 4 is a top plan view of the armature shown in FIG. 2.

Referring now to the drawings, this invention comprises a solenoid-operated valve having a main body, indicated generally by the numeral 10, and made up of a block member 11 and a tubular armature guide or sleeve 12 integral with a plunger stop 13. The block member 11, armature guide 12 and plunger stop 13 are formed to provide a valve chamber 14 having an outlet port 15, a bleeder port 16 and inlet passage 17. The armature guide 12 is mounted on block 11 in threaded relation thereto, as shown at 18. A seal such as an O-ring 19 may be provided for the threaded connection between the block 11 and guide 12.

A solenoid-operated armature 20 is slidably mounted within the guide 12 and has extending therethrough a bore 21 having a central cylindrical portion 22 and reduced diameter portions 23 and 24 at each of its ends. A pair of plungers 25 and 26 are reciprocably received in the bore 21 and have enlarged portions 27 and 28 received in the central cylindrical portion 22 of the aperture. Each plunger has a smaller portion 29 and 30 received in the reduced diameter portions of the bore and extending outwardly of the bore toward seat insert 31 mounted in block 11 to communicate with port 16 and toward the passage opening 32 of the passage 17, respectively. A spring 35 is received within the bore 21 in such a manner as to bear against the enlarged portions 27 and 28 of the plungers 25 and 26 to yieldably urge the plungers outwardly of the armature to positions in which the enlarged portions 27 and 28 engage abutment surfaces 33 and 34, respectively.

Armature 20 is provided with a pair of slots 41—41 which serve the double function of providing a path or channel for flow of fluid through chamber 14 and also of reducing eddy current losses. The lower end of armature 20 includes a flange 42 upon which is seated a coil spring 43. The upper end of spring 43 bears on the lower end of guide 12 whereby spring 43 serves the purpose of normally biasing armature 20 downwardly to close plunger 26 with seat 31. The upper end of armature 20 is provided with a conical surface 44 having an angle of approximately 30° for the purpose of providing minimum resistance to flow of hydraulic fluid. The plunger 25 extends from the apex of conical surface 27 and has an apex angle of approximately 60° also to provide minimum resistance to the flow of hydraulic fluid from passage 17.

The magnetic structure of the valve consists of a yoke 45 having laminations wound upon one another in the manner illustrated in FIG. 2 and being formed to have an aperture for receiving the guide member 12. The upper end of yoke 45 is also provided with an aperture adapted to receive the stationary plunger stop 13 which is threaded at 46 to receive the nut 47 for holding the casing 48 in place. Plunger stop 13 may be soldered or otherwise fastened at its lower end to guide 12 (or may be integral therewith as shown in FIG. 2), and is slotted to provide four slots 49, which serve the purpose of reducing eddy current losses. The lower end of the plunger stop 13 has a conical surface 50 which mates with surface 44 of armature 20. A conventional solenoid coil 51 is mounted within the yoke 45 to provide electromagnetic energy in accordance with conventional theory.

Plunger stop 13 is provided with one-half of a shading coil 55 mounted in a suitable circular slot as shown, while armature 20 is provided with the other half 56 of the shading coil nested within a suitable circular slot as shown. The function of shading coils is well known in electromagnetic devices and, therefore, no detailed description is deemed to be necessary.

In operation, coil 51 may be energized by conventional control means thereby to create flow of magnetic flux in yoke 45. Magnetic flux flows through the various legs of yoke 45 and through armature 20 and plunger stop 13. In accordance with well known theory, this results in a creation of forces which move the armature upwardly to engage plunger 25 with the outlet 32 of passage 17. Simultaneously, plunger 26 is moved free of seat 31 thereby opening the passage through seat 31. When coil 51 is de-energized, the reverse action occurs.

Assume that the valve is in the position of FIG. 2 and the coil 51 is energized. The armature 20 begins to move upwardly with increasing speed as the electromagnetic force in the coil increases. The plunger 26 remains seated until abutment 34 strikes the enlarged portion 28 of the plunger with a hammer-like blow so as to cleanly and rapidly open the bleeder port 16 to fluid flow from the chamber 14. The armature continues to move upwardly and the plunger 26 seats in the passage opening 32 to close off flow from the passage 17. Any shock resulting from such seating is cushioned by the spring 35 and the enlarged portion 27 of the plunger 25 is moved inwardly out of contact with the abutment 33. When the coil 51 is de-energized the action is reversed, the spring 35 absorbs the shock of the plunger 26 seating in seat 31 and the device again assumes the position of FIG. 2.

The primary purpose of the valve disclosed herein is to shut off the flow of high pressure fluid through the passage 17 in plunger stop 13. The forces created by the solenoid structure must be sufficient not only to overcome the force of return spring 43 and the fluid pressure which is developed on the plunger 25, but also the thrust produced by the high pressure jet of fluid impinging on the face of the armature 20 and that developed by the fluid flow through the slots 41 of armature 20.

In order to reduce the effects of the thrust developed by the high pressure jet of fluid impinging on the top of armature 20, the upper end of the armature has been given the form of a cone having an apex angle of approximately 120°. It has been found by experiment that such a cone angle reduces the impact force created by the high pressure jet of fluid flowing out of passage 40 to a very substantial degree without materially impairing the electromagnetic performance.

It is recognized that, according to electromagnetic theory, the most efficient type of armature would be one having a flat or square end portion, but it is not feasible to use a plunger of this type in the valve of this invention because the impact force of the high pressure jet would be so great that it would be extremely difficult or substantially impossible to raise the armature into its valve closing position. Therefore, it is necessary to compromise the electromagnetic characteristics of the armature in favor of providing a conical end on the armature. Since the fluid flow impinges directly on plunger 25, maximum reduction of impact force is achieved by providing a conical force on the plunger having an apex angle of approximately 60°.

Hydraulic thrust on the armature 20 caused by flow of fluid through the slots 41 is reduced by providing only two slots which constitute paths or channels having relatively low hydraulic flow resistance between the upper end of armature 20 and the lower portion of chamber 14. In conventional valves of this type a large number of slots are usually provided supposedly for the purpose of reducing eddy current losses. It has been discovered, however, that by reducing the number of slots and increasing the cross sectional area of the slots, the same area for fluid flow is obtained, but the frictional surface area through which the fluid flows has been reduced by substantially one-third. This results in substantial reduction in the skin friction between the flowing fluid and the surfaces of the slots and also results in substantial reduction in the turbulence of the fluid flowing in the slots, greatly reducing the hydraulic pressure head required to force the fluid from above the armature 20 to the lower portion of valve chamber 14.

The hydraulic thrust forces which result from fluid friction in the slots and tend to force the armature 20 downwardly are equal to the hydraulic pressure drop between the conical gap above the armature 20 and the lower portion of valve chamber 14 multiplied by the entire cross sectional area of the armature 20. Quite obviously the structure shown will reduce this hydraulic force to a very substantial extent while only removing the same net cross sectional area from the armature 20 as in conventional structure. It should also be noted that while the use of only two slots may not reduce eddy current losses to the same extent as would a larger number of slots, the relatively large increase in hydraulic efficiency far outweighs the disadvantage of a slight increase in eddy current losses.

From the foregoing description it will be apparent that the solenoid valve incorporating this invention has a relatively low electromagnetic loss characteristic while hydraulic efficiency has been substantially increased. As a consequence, it is possible to operate high pressure valves with relatively smaller and less expensive electromagnetic structure. It will also be apparent that the arrangement and mounting of the plungers 25 and 26 within the armature 20 makes possible cleaner more rapid operation of the valve with little wear on the faces of the plungers 25 and 26.

The invention claimed is:

1. A solenoid-operated valve comprising an element formed to provide a chamber, said element having a pair of passages opening into said chamber on opposite sides thereof, an armature, a pair of plungers reciprocably mounted in said armature so as to project oppositely therefrom toward respective ones of said passage openings, said plungers having outward faces formed for seating in said passage openings, said armature being formed with a pair of abutments for preventing movement of said plungers past respective outermost positions relative to said armature, and a spring arranged between said plungers and yieldably urging said plungers into their outermost positions, said armature being reciprocably mounted within said element for movement between a position in which one plunger is seated in one passage opening and a position in which the other plunger is seated in the other passage opening.

2. A solenoid-operated valve comprising an element formed to provide a chamber, said element having a pair of passages opening into said chamber on opposite sides thereof, an armature, a pair of plungers reciprocably mounted in said armature so as to project oppositely therefrom toward respective ones of said passage openings, said plungers having outward faces formed for seating in said valve seats, said armature being formed with a pair of abutments for preventing movement of said plungers past respective outermost positions relative to said armature, and a spring arranged between said plungers and yieldably urging said plungers into their outermost positions, a solenoid arranged to move said armature, when said solenoid is energized, into a position in which one plunger is seated in one passage opening, and a second spring arranged to yieldably urge said armature into a position in which the other plunger is seated in the other valve seat, said solenoid and second spring acting with sufficient force that, when either of said plungers is so seated, the first mentioned spring is depressed and the seated plunger is forced inwardly from its outermost position.

3. A solenoid-operated valve comprising an element formed to provide a chamber, said element having a pair of passages opening into said chamber on opposite sides thereof, an armature having an aperture therethrough provided with a central cylindrical portion, provided at each of its ends with a reduced diameter portion and provided with an abutment surface joining each reduced diameter portion with the central cylindrical portion, a pair of plungers reciprocably received in said aperture, each of said plungers having an enlarged portion received in said central cylindrical portion and a smaller portion received in a respective one of the reduced diameter portions of said aperture and extending outwardly of said aperture toward a respective one of said passage openings, each of said plungers having an outward face formed for seating in a respective one of said passage openings, and a spring received in said aperture and bearing against the enlarged portions of said plungers for yieldably urging said plungers outwardly of said armature to positions in which said enlarged portions abut said abutment surfaces, said armature being reciprocably mounted within said element for movement between a position in which one seating member is seated in its respective passage opening and a position in which the other seating member is seated in its respective passage opening, said spring being of such a strength that, when a respective plunger is seated in its respective passage opening, said spring is depressed and the enlarged portion of the respective plunger is forced away from its respective abutment surface of said aperture.

4. A solenoid-operated valve comprising a main body formed internally to provide a chamber, a solenoid structure mounted on said main body adjacent to said chamber, an armature slidably received in said chamber, said main body having a pair of passages communicating between the outside of said main body and said chamber, each of said passages having an opening into said chamber on an opposite side of said armature, a pair of plungers reciprocably mounted in said armature so as to project oppositely therefrom toward respective ones of said passage openings, said plungers having outward faces formed for seating in said passage openings, said armature being formed with a pair of abutments for preventing movement of said plungers past respective outermost positions relative to said armature, and a spring arranged between said plungers and yieldably urging said plungers into their outermost positions, said armature being arranged to reciprocate between a position in which one plunger is seated in one passage opening and a position in which the other plunger is seated in the other passage opening, said solenoid being adapted to move said armature to one of said positions, and resilient means acting between said armature and main body for moving said armature to the other position.

5. A solenoid-operated valve comprising a main body formed internally to provide a chamber, a solenoid structure mounted on said main body adjacent to said chamber, an armature slidably received in said chamber, said main body having a pair of passages communicating between the outside of said main body and said chamber, each of said passages having an opening into said chamber on an opposite side of said armature, a pair of plungers reciprocably mounted in said armature so as to project oppositely therefrom toward respective ones of said passage openings, said plungers having outward faces formed for seating in said passage openings, said armature being formed with a pair of abutments and said plungers each having an abutment adapted to engage a respective armature abutment for preventing movement of said plungers past respective outermost positions relative to said armature, and a spring arranged between said plungers and yieldably urging said plungers into their outermost positions, said solenoid structure being arranged to move said armature, when said solenoid is energized, into a position in which one plunger is seated in one passage opening, and a second spring acting between said main body and said armature and arranged to yieldably urge said armature into a position in which the other plunger is seated in the other passage opening, said solenoid and said spring acting with sufficient force that, when either of said plungers is so seated, the first mentioned spring is depressed and the seated plunger is forced inwardly from its outermost position.

6. The solenoid-operated valve of claim 5 in which the outward face of each plunger has a conical shape, in which each passage opening is formed to mate with the conical outward face of each plunger, in which said armature has fluid flow slots providing communication between the area of the chamber adjacent one passage opening and the area of the chamber adjacent the other passage opening, and in which said main body is formed with an additional passage communicating between the outside of said main body and said chamber and opening into said chamber on one side of said armature.

7. A valve comprising an element formed to provide a chamber, said element having a pair of passages opening into said chamber, a member, a pair of plungers reciprocably mounted in said member so as to project oppositely therefrom toward respective ones of said passage openings, said plungers having outward faces formed for seating in said passage openings, said member being formed with a pair of abutments for preventing movement of said plungers past respective outermost positions relative to said member, a spring arranged between said plungers and yieldably urging said plungers into their outermost positions, said member being arranged to reciprocate between a position in which one plunger is seated in one passage opening and a position in which the other plunger is seated in the other passage opening, and means for forcing said member toward and away from said passage openings.

References Cited in the file of this patent
UNITED STATES PATENTS

| 2,222,419 | McCarty | Nov. 19, 1940 |
| 2,557,514 | Ray | June 19, 1951 |
| 2,607,368 | Mayer | Aug. 19, 1952 |

FOREIGN PATENTS

| 660,750 | Germany | June 2, 1938 |
| 1,012,005 | France | Apr. 9, 1952 |